(12) United States Patent
Dawson et al.

(10) Patent No.: US 12,168,375 B1
(45) Date of Patent: Dec. 17, 2024

(54) MOTION CONTROL SYSTEM

(71) Applicants: Jacob L. Dawson, Sunnyvale, CA (US); Chung Shen Ang, Cupertino, CA (US); Islam M. Shawki, Sunnyvale, CA (US); Keyvan Yeganeh, San Jose, CA (US)

(72) Inventors: Jacob L. Dawson, Sunnyvale, CA (US); Chung Shen Ang, Cupertino, CA (US); Islam M. Shawki, Sunnyvale, CA (US); Keyvan Yeganeh, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/405,624

(22) Filed: Jan. 5, 2024

Related U.S. Application Data

(60) Provisional application No. 63/481,620, filed on Jan. 26, 2023.

(51) Int. Cl.
*B60G 15/02* (2006.01)
*B60G 3/20* (2006.01)
(Continued)

(52) U.S. Cl.
CPC .............. *B60G 15/02* (2013.01); *B60G 3/20* (2013.01); *B60G 13/001* (2013.01); *B60G 13/02* (2013.01);
(Continued)

(58) Field of Classification Search
CPC ........ B60G 15/00; B60G 15/02; B60G 15/04; B60G 15/06; B60G 15/061; B60G 15/062;
(Continued)

(56) References Cited

U.S. PATENT DOCUMENTS 2,537,479 A * 1/1951 Motte ...................... B60G 3/01
180/385
2,757,938 A 8/1956 Crowder
(Continued)

FOREIGN PATENT DOCUMENTS

CN 108215946 A 6/2018
CN 208439009 U 1/2019
(Continued)

OTHER PUBLICATIONS

SAE International, "Michelin re-invents the wheel", Oct. 14, 2008, Downloaded Sep. 7, 2017, http://articles.sae.org/4604/ (2 pp).
(Continued)

*Primary Examiner* — Keith J Frisby
(74) *Attorney, Agent, or Firm* — Young Basile Hanlon & MacFarlane, P.C.

(57) ABSTRACT

A motion control system includes an absorber fixed relative to an axis, a spring fixed relative to the axis, and a mass coupled to the absorber and the spring and configured to move relative to the axis. The spring is configured to bias the mass toward a neutral position and with the absorber configured to dampen movement of the mass. The mass includes an internal surface and an external surface spaced from the internal surface. The external surface extends between a first end and a second end, with the first end closer to the axis than the second end. At least a portion of the external surface tapers away from the axis and toward the internal surface further from the first end to direct debris away from the axis.

20 Claims, 4 Drawing Sheets

(51) Int. Cl.
  *B60G 13/00* (2006.01)
  *B60G 13/02* (2006.01)
  *B60G 13/16* (2006.01)
  *B60T 1/06* (2006.01)
  *F16F 7/104* (2006.01)
  *F16F 13/00* (2006.01)
  *F16F 15/02* (2006.01)

(52) U.S. Cl.
  CPC ............ *B60G 13/16* (2013.01); *B60T 1/065* (2013.01); *F16F 7/104* (2013.01); *F16F 13/005* (2013.01); *F16F 15/022* (2013.01); *B60G 2200/144* (2013.01); *B60G 2200/156* (2013.01); *B60G 2202/21* (2013.01); *B60G 2202/312* (2013.01); *B60G 2202/32* (2013.01)

(58) Field of Classification Search
  CPC .... B60G 15/063; B60G 15/067; B60G 15/07; B60G 3/18; B60G 3/20; B60G 3/01; B60G 2200/14; B60G 2200/144; B60G 2200/1442; B60G 2200/154; B60G 2200/156; B60G 2204/30; B60G 2204/129; B60G 13/00; B60G 13/001; B60G 13/003; B60G 13/005; B60G 13/006; B60G 13/02; B60G 13/04; B60G 13/06; B60G 13/08; B60G 13/10; B60G 13/12; B60G 13/16; B60G 13/18; B60G 2202/12; B60G 2202/20; B60G 2202/21; B60G 2202/23; B60G 2202/24; B60G 2202/242; B60G 2202/25; B60G 2202/30; B60G 2202/31; B60G 2202/312; B60G 2202/32; B60T 1/065; B60T 1/06; F16F 7/104; F16F 7/108; F16F 7/112; F16F 7/116; F16F 13/00; F16F 13/005; F16F 13/007; F16F 15/02; F16F 15/022
  USPC .................................................. 280/124.141
  See application file for complete search history.

(56) References Cited

U.S. PATENT DOCUMENTS

| | | |
|---|---|---|
| 2,901,239 A | 8/1959 | Sethna |
| 2,913,252 A | 11/1959 | Norrie |
| 2,955,841 A | 10/1960 | Faiver et al. |
| 3,089,710 A | 5/1963 | Fiala |
| 3,231,058 A | 1/1966 | Batchelor et al. |
| 3,236,334 A | 2/1966 | Wallerstein, Jr. |
| 3,322,379 A | 5/1967 | Flannelly |
| 3,368,824 A | 2/1968 | Julien |
| 3,441,238 A | 4/1969 | Flannelly |
| 3,781,032 A | 12/1973 | Jones |
| 3,970,162 A | 7/1976 | Le Salver et al. |
| 4,206,935 A | 6/1980 | Sheppard et al. |
| 4,379,572 A | 4/1983 | Hedenberg |
| 4,530,514 A | 7/1985 | Ito |
| 4,537,420 A | 8/1985 | Ito et al. |
| 4,589,678 A | 5/1986 | Lund |
| 4,613,152 A | 9/1986 | Booher |
| 4,614,359 A | 9/1986 | Lundin et al. |
| 4,634,142 A | 1/1987 | Woods et al. |
| 4,637,628 A | 1/1987 | Perkins |
| 4,643,270 A | 2/1987 | Beer |
| 4,656,409 A | 4/1987 | Shimizu |
| 4,659,106 A | 4/1987 | Fujita et al. |
| 4,784,378 A | 11/1988 | Ford |
| 4,834,416 A | 5/1989 | Shimoe et al. |
| 4,877,098 A | 10/1989 | Asanuma |
| 4,893,832 A | 1/1990 | Booher |
| 4,922,159 A | 5/1990 | Phillips et al. |
| 4,926,978 A | 5/1990 | Shibata et al. |
| 4,960,290 A | 10/1990 | Bose |
| 4,981,309 A | 1/1991 | Froeschle et al. |
| 4,991,698 A | 2/1991 | Hanson |
| 5,027,048 A | 6/1991 | Masrur et al. |
| 5,033,028 A | 7/1991 | Browning |
| 5,060,959 A | 10/1991 | Davis et al. |
| 5,103,942 A | 4/1992 | Schmitt |
| 5,172,930 A | 12/1992 | Boye et al. |
| 5,244,053 A | 9/1993 | Kashiwagi |
| 5,251,926 A | 10/1993 | Aulerich et al. |
| 5,364,081 A | 11/1994 | Hartl |
| 5,392,882 A | 2/1995 | Mackovjak et al. |
| 5,401,053 A | 3/1995 | Sahm et al. |
| 5,409,254 A | 4/1995 | Minor et al. |
| 5,468,055 A | 11/1995 | Simon et al. |
| 5,507,518 A | 4/1996 | Nakahara et al. |
| 5,517,414 A | 5/1996 | Hrovat |
| 5,612,110 A | 3/1997 | Watremez |
| 5,645,250 A | 7/1997 | Gevers |
| 5,678,847 A | 10/1997 | Izawa et al. |
| 5,785,345 A | 7/1998 | Barlas et al. |
| 5,810,335 A | 9/1998 | Wirtz et al. |
| 5,829,764 A | 11/1998 | Griffiths |
| 5,880,542 A | 3/1999 | Leary et al. |
| 6,032,770 A | 3/2000 | Alcone et al. |
| 6,113,119 A | 9/2000 | Laurent et al. |
| 6,142,494 A | 11/2000 | Higuchi |
| 6,152,267 A | 11/2000 | Iwai et al. |
| 6,170,838 B1 | 1/2001 | Laurent et al. |
| 6,233,510 B1 | 5/2001 | Platner et al. |
| 6,249,728 B1 | 6/2001 | Streiter |
| 6,260,869 B1 | 7/2001 | Hanlon et al. |
| 6,276,710 B1 | 8/2001 | Sutton |
| 6,314,353 B1 | 11/2001 | Ohsaku et al. |
| 6,357,770 B1 | 3/2002 | Carpiaux et al. |
| 6,364,078 B1 | 4/2002 | Parison et al. |
| 6,443,436 B1 | 9/2002 | Schel |
| 6,470,248 B2 | 10/2002 | Shank et al. |
| 6,502,837 B1 | 1/2003 | Hamilton et al. |
| 6,513,819 B1 | 2/2003 | Oliver et al. |
| 6,634,445 B2 | 10/2003 | Dix et al. |
| 6,637,561 B1 | 10/2003 | Collins et al. |
| 6,873,891 B2 | 3/2005 | Moser et al. |
| 6,926,288 B2 | 8/2005 | Bender |
| 6,940,248 B2 | 9/2005 | Maresca et al. |
| 6,945,541 B2 | 9/2005 | Brown |
| 7,017,690 B2 | 3/2006 | Burke |
| 7,032,723 B2 | 4/2006 | Quaglia et al. |
| 7,051,851 B2 | 5/2006 | Svartz et al. |
| 7,140,601 B2 | 11/2006 | Nesbitt et al. |
| 7,195,250 B2 | 3/2007 | Knox et al. |
| 7,202,577 B2 | 4/2007 | Parison et al. |
| 7,302,825 B2 | 12/2007 | Knox |
| 7,308,351 B2 | 12/2007 | Knoop et al. |
| 7,392,997 B2 | 7/2008 | Sanville et al. |
| 7,401,794 B2 | 7/2008 | Laurent et al. |
| 7,421,954 B2 | 9/2008 | Bose |
| 7,427,072 B2 | 9/2008 | Brown |
| 7,484,744 B2 | 2/2009 | Galazin et al. |
| 7,502,589 B2 | 3/2009 | Howard et al. |
| 7,543,825 B2 | 6/2009 | Yamada |
| 7,551,749 B2 | 6/2009 | Rosen et al. |
| 7,597,169 B2 | 10/2009 | Borroni-Bird et al. |
| 7,641,010 B2 | 1/2010 | Mizutani et al. |
| 7,644,938 B2 | 1/2010 | Yamada |
| 7,654,540 B2 | 2/2010 | Parison et al. |
| 7,734,384 B2 | 6/2010 | Konopa et al. |
| 7,818,109 B2 | 10/2010 | Scully |
| 7,823,891 B2 | 11/2010 | Bushko et al. |
| 7,899,607 B2 | 3/2011 | Shin et al. |
| 7,932,684 B2 | 4/2011 | O'Day et al. |
| 7,962,261 B2 | 6/2011 | Bushko et al. |
| 7,963,529 B2 | 6/2011 | Oteman et al. |
| 7,976,038 B2 | 7/2011 | Gregg |
| 8,047,551 B2 | 11/2011 | Morris et al. |
| 8,067,863 B2 | 11/2011 | Giovanardi |
| 8,095,268 B2 | 1/2012 | Parison et al. |
| 8,099,213 B2 | 1/2012 | Zhang et al. |
| 8,109,371 B2 | 2/2012 | Kondo et al. |
| 8,112,198 B2 | 2/2012 | Parison, Jr. et al. |

(56) References Cited

U.S. PATENT DOCUMENTS

| | | |
|---|---|---|
| 8,113,522 B2 | 2/2012 | Oteman et al. |
| 8,127,900 B2 | 3/2012 | Inoue |
| 8,157,036 B2 | 4/2012 | Yogo et al. |
| 8,191,874 B2 | 6/2012 | Inoue et al. |
| 8,282,149 B2 | 10/2012 | Kniffin et al. |
| 8,336,319 B2 | 12/2012 | Johnston et al. |
| 8,356,861 B2 | 1/2013 | Kniffin et al. |
| 8,360,387 B2 | 1/2013 | Breen et al. |
| 8,370,022 B2 | 2/2013 | Inoue et al. |
| 8,387,762 B2 | 3/2013 | Kondo et al. |
| 8,417,417 B2 | 4/2013 | Chen et al. |
| 8,428,305 B2 | 4/2013 | Zhang et al. |
| 8,466,639 B2 | 6/2013 | Parison, Jr. et al. |
| 8,474,801 B2 | 7/2013 | Ishiguro et al. |
| 8,490,761 B2 | 7/2013 | Kondo |
| 8,499,903 B2 | 8/2013 | Sakuta et al. |
| 8,525,453 B2 | 9/2013 | Ogawa |
| 8,548,678 B2 | 10/2013 | Ummethala et al. |
| 8,579,311 B2 | 11/2013 | Butlin, Jr. et al. |
| 8,598,831 B2 | 12/2013 | Ogawa et al. |
| 8,632,078 B2 | 1/2014 | Ehrlich et al. |
| 8,641,052 B2 | 2/2014 | Kondo et al. |
| 8,641,053 B2 | 2/2014 | Pare et al. |
| 8,668,060 B2 | 3/2014 | Kondo et al. |
| 8,682,530 B2 | 3/2014 | Nakamura |
| 8,701,845 B2 | 4/2014 | Kondo |
| 8,725,351 B1 | 5/2014 | Selden et al. |
| 8,744,680 B2 | 6/2014 | Rieger et al. |
| 8,744,694 B2 | 6/2014 | Ystueta |
| 8,757,309 B2 | 6/2014 | Schmitt et al. |
| 8,783,430 B2 | 7/2014 | Brown |
| 8,890,461 B2 | 11/2014 | Knox et al. |
| 8,930,074 B1 | 1/2015 | Lin |
| 8,938,333 B2 | 1/2015 | Bose et al. |
| 9,033,121 B2 | 5/2015 | Kazmirski et al. |
| 9,038,271 B2 | 5/2015 | Huang et al. |
| 9,062,737 B2 | 6/2015 | Hoult |
| 9,062,983 B2 | 6/2015 | Zych |
| 9,079,473 B2 | 7/2015 | Lee et al. |
| 9,102,209 B2 | 8/2015 | Giovanardi et al. |
| 9,291,300 B2 | 3/2016 | Parker et al. |
| 9,316,667 B2 | 4/2016 | Ummethala et al. |
| 9,349,304 B2 | 5/2016 | Sangermano, II et al. |
| 9,399,384 B2 | 7/2016 | Lee et al. |
| 9,428,029 B2 | 8/2016 | Job |
| 9,533,539 B2 | 1/2017 | Eng et al. |
| 9,550,495 B2 | 1/2017 | Tatourian et al. |
| 9,625,902 B2 | 4/2017 | Knox |
| 9,643,467 B2 | 5/2017 | Selden et al. |
| 9,676,244 B2 | 6/2017 | Giovanardi et al. |
| 9,702,349 B2 | 7/2017 | Anderson et al. |
| 9,821,835 B2 | 11/2017 | Ferrer-Dalmau Nieto et al. |
| 9,855,887 B1 | 1/2018 | Potter et al. |
| 9,868,332 B2 | 1/2018 | Anderson et al. |
| 9,884,545 B1 | 2/2018 | Addanki et al. |
| 9,909,644 B2 | 3/2018 | Cegar et al. |
| 9,975,391 B2 | 5/2018 | Tseng et al. |
| 10,054,203 B2 | 8/2018 | Fida |
| 10,065,474 B2 | 9/2018 | Trangbaek |
| 10,081,408 B2 | 9/2018 | Yoshida |
| 10,093,145 B1 | 10/2018 | Vaughan et al. |
| 10,245,984 B2 | 4/2019 | Parker et al. |
| 10,300,760 B1 | 5/2019 | Aikin et al. |
| 10,315,481 B2 | 6/2019 | Lu et al. |
| 10,377,371 B2 | 8/2019 | Anderson et al. |
| 10,378,599 B2 | 8/2019 | Mettrick et al. |
| 10,407,035 B1 | 9/2019 | Gadda et al. |
| 10,513,161 B2 | 12/2019 | Anderson et al. |
| 10,960,723 B1 | 3/2021 | Hall et al. |
| 11,078,981 B2 | 8/2021 | Zhang et al. |
| 11,285,773 B1 | 3/2022 | Hall et al. |
| 2001/0045719 A1 | 11/2001 | Smith |
| 2002/0190486 A1 | 12/2002 | Phillis et al. |
| 2003/0030241 A1 | 2/2003 | Lawson |
| 2003/0080526 A1 | 5/2003 | Conover |
| 2004/0054455 A1 | 3/2004 | Voight et al. |
| 2004/0074720 A1 | 4/2004 | Thieltges |
| 2004/0094912 A1 | 5/2004 | Niwa et al. |
| 2004/0226788 A1 | 11/2004 | Tanner |
| 2004/0245732 A1 | 12/2004 | Kotulla et al. |
| 2005/0051986 A1 | 3/2005 | Galazin et al. |
| 2005/0096171 A1 | 5/2005 | Brown et al. |
| 2005/0199457 A1 | 9/2005 | Beck |
| 2005/0206231 A1 | 9/2005 | Lu et al. |
| 2005/0211516 A1 | 9/2005 | Kondo et al. |
| 2005/0230170 A1 | 10/2005 | Robinson |
| 2005/0241899 A1 | 11/2005 | Rutz et al. |
| 2005/0247496 A1 | 11/2005 | Nagaya |
| 2006/0043804 A1 | 3/2006 | Kondou |
| 2006/0076828 A1 | 4/2006 | Lu et al. |
| 2006/0119064 A1 | 6/2006 | Mizuno et al. |
| 2006/0181034 A1 | 8/2006 | Wilde et al. |
| 2006/0266599 A1 | 11/2006 | Denys et al. |
| 2006/0273530 A1 | 12/2006 | Zuber |
| 2007/0045036 A1 | 3/2007 | Takeuchi et al. |
| 2007/0069496 A1 | 3/2007 | Rinehart et al. |
| 2007/0107959 A1 | 5/2007 | Suzuki et al. |
| 2007/0114706 A1 | 5/2007 | Myers |
| 2007/0199750 A1 | 8/2007 | Suzuki et al. |
| 2007/0210539 A1 | 9/2007 | Hakui et al. |
| 2008/0017462 A1 | 1/2008 | Mizutani et al. |
| 2008/0100020 A1 | 5/2008 | Gashi et al. |
| 2008/0111334 A1 | 5/2008 | Inoue et al. |
| 2008/0164111 A1 | 7/2008 | Inoue et al. |
| 2008/0185807 A1 | 8/2008 | Takenaka |
| 2008/0283315 A1 | 11/2008 | Suzuki et al. |
| 2009/0033055 A1 | 2/2009 | Morris et al. |
| 2009/0064808 A1 | 3/2009 | Parison et al. |
| 2009/0071743 A1 | 3/2009 | Gashi |
| 2009/0095584 A1 | 4/2009 | Kondo et al. |
| 2009/0120745 A1 | 5/2009 | Kondo et al. |
| 2009/0121398 A1 | 5/2009 | Inoue |
| 2009/0173585 A1 | 7/2009 | Kappagantu |
| 2009/0174158 A1 | 7/2009 | Anderson et al. |
| 2009/0198419 A1 | 8/2009 | Clark |
| 2009/0218867 A1 | 9/2009 | Clark |
| 2009/0243402 A1 | 10/2009 | O'Day et al. |
| 2009/0243598 A1 | 10/2009 | O'Day |
| 2009/0273147 A1 | 11/2009 | Inoue et al. |
| 2009/0286910 A1 | 11/2009 | Bloomfield |
| 2009/0302559 A1 | 12/2009 | Doerfel |
| 2009/0321201 A1 | 12/2009 | Sakuta et al. |
| 2010/0044977 A1 | 2/2010 | Hughes et al. |
| 2010/0059959 A1 | 3/2010 | Kim |
| 2010/0116572 A1 | 5/2010 | Schmitt et al. |
| 2010/0200343 A1 | 8/2010 | Kondo et al. |
| 2010/0207344 A1 | 8/2010 | Nakamura |
| 2010/0222960 A1 | 9/2010 | Oida et al. |
| 2010/0230876 A1 | 9/2010 | Inoue et al. |
| 2010/0252376 A1 | 10/2010 | Chern et al. |
| 2010/0253019 A1 | 10/2010 | Ogawa |
| 2011/0115183 A1 | 5/2011 | Alesso et al. |
| 2011/0209938 A1 | 9/2011 | Basadzishvili |
| 2011/0226570 A1 | 9/2011 | Ludwig |
| 2011/0250477 A1 | 10/2011 | Yoshida et al. |
| 2011/0277241 A1 | 11/2011 | Schejbal |
| 2012/0013277 A1 | 1/2012 | Ogawa |
| 2012/0059547 A1 | 3/2012 | Chen et al. |
| 2012/0109483 A1 | 5/2012 | O'Dea et al. |
| 2012/0153718 A1 | 6/2012 | Rawlinson et al. |
| 2012/0181757 A1 | 7/2012 | Oteman et al. |
| 2012/0187640 A1 | 7/2012 | Kondo et al. |
| 2012/0193847 A1 | 8/2012 | Muragishi et al. |
| 2012/0305348 A1 | 12/2012 | Katayama et al. |
| 2012/0306170 A1 | 12/2012 | Serbu et al. |
| 2013/0032442 A1 | 2/2013 | Tuluie |
| 2013/0037362 A1 | 2/2013 | Gartner et al. |
| 2013/0060422 A1 | 3/2013 | Ogawa et al. |
| 2013/0060423 A1 | 3/2013 | Jolly |
| 2013/0087420 A1 | 4/2013 | Fraley et al. |
| 2013/0106074 A1 | 5/2013 | Koku et al. |
| 2013/0112514 A1 | 5/2013 | Hanna et al. |
| 2013/0221625 A1 | 8/2013 | Pare et al. |
| 2013/0229074 A1 | 9/2013 | Haferman et al. |

(56) References Cited

U.S. PATENT DOCUMENTS

| | | |
|---|---|---|
| 2013/0233632 A1 | 9/2013 | Kim et al. |
| 2013/0253764 A1 | 9/2013 | Kikuchi et al. |
| 2013/0277155 A1 | 10/2013 | Huang et al. |
| 2013/0341143 A1 | 12/2013 | Brown |
| 2014/0001687 A1 | 1/2014 | Braman et al. |
| 2014/0005888 A1 | 1/2014 | Bose et al. |
| 2014/0145498 A1 | 5/2014 | Yamakado et al. |
| 2014/0156143 A1 | 6/2014 | Evangelou et al. |
| 2014/0260233 A1 | 9/2014 | Giovanardi et al. |
| 2014/0312580 A1 | 10/2014 | Gale |
| 2014/0358378 A1 | 12/2014 | Howard et al. |
| 2015/0047933 A1 | 2/2015 | Keil et al. |
| 2015/0123370 A1 | 5/2015 | Lee et al. |
| 2015/0197130 A1 | 7/2015 | Smith et al. |
| 2015/0224845 A1 | 8/2015 | Anderson et al. |
| 2015/0231939 A1 | 8/2015 | Yamamotoya et al. |
| 2015/0231942 A1 | 8/2015 | Trangbaek et al. |
| 2015/0343876 A1 | 12/2015 | Yoshizawa et al. |
| 2015/0354647 A1 | 12/2015 | Tironi et al. |
| 2016/0059658 A1 | 3/2016 | Kuriki |
| 2016/0096458 A1 | 4/2016 | Parker et al. |
| 2016/0159187 A1 | 6/2016 | Mohamed |
| 2016/0167743 A1 | 6/2016 | Melcher |
| 2016/0200164 A1 | 7/2016 | Tabata et al. |
| 2016/0291574 A1 | 10/2016 | Parison |
| 2016/0339823 A1 | 11/2016 | Smith et al. |
| 2016/0347143 A1 | 12/2016 | Hrovat et al. |
| 2017/0047823 A1 | 2/2017 | Sangermano, III et al. |
| 2017/0100980 A1 | 4/2017 | Tsuda |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2017/0137023 A1 | 5/2017 | Anderson et al. |
| 2017/0144501 A1 | 5/2017 | Wall |
| 2017/0203673 A1 | 7/2017 | Parker et al. |
| 2017/0240018 A1 | 8/2017 | Mettrick et al. |
| 2017/0241504 A1 | 8/2017 | Delorenzis et al. |
| 2017/0253101 A1 | 9/2017 | Kuriki |
| 2017/0253155 A1 | 9/2017 | Knox et al. |
| 2018/0015801 A1 | 1/2018 | Mohamed et al. |
| 2018/0022178 A1 | 1/2018 | Xi |
| 2018/0029585 A1 | 2/2018 | Tanimoto |
| 2018/0056748 A1 | 3/2018 | Grimes |
| 2018/0056767 A1* | 3/2018 | Dolgov .............. B60K 7/0007 |
| 2018/0065438 A1 | 3/2018 | Ogawa et al. |
| 2018/0079272 A1 | 3/2018 | Aikin |
| 2018/0089901 A1 | 3/2018 | Rober et al. |
| 2018/0105082 A1 | 4/2018 | Knox |
| 2018/0126816 A1 | 5/2018 | Kondo et al. |
| 2018/0134111 A1 | 5/2018 | Toyohira et al. |
| 2018/0162186 A1 | 6/2018 | Anderson et al. |
| 2018/0162187 A1 | 6/2018 | Trangbaek |
| 2018/0195570 A1 | 7/2018 | Churchill et al. |
| 2018/0208009 A1 | 7/2018 | McGuire et al. |
| 2018/0222274 A1 | 8/2018 | Davis et al. |
| 2018/0297587 A1 | 10/2018 | Kasaiezadeh Mahabadi et al. |
| 2018/0345747 A1 | 12/2018 | Boon et al. |
| 2018/0370314 A1 | 12/2018 | Higle |
| 2019/0011004 A1 | 1/2019 | Mettrick et al. |
| 2019/0023094 A1 | 1/2019 | Panagis et al. |
| 2019/0118604 A1 | 4/2019 | Suplin et al. |
| 2019/0248203 A1 | 8/2019 | Krehmer et al. |
| 2019/0308484 A1 | 10/2019 | Belter et al. |
| 2020/0088214 A1 | 3/2020 | Woodard et al. |
| 2020/0171907 A1 | 6/2020 | Hall et al. |
| 2020/0180386 A1 | 6/2020 | Tabata et al. |
| 2020/0216128 A1 | 7/2020 | Doerksen |
| 2021/0061046 A1 | 3/2021 | Simon et al. |
| 2021/0070129 A1 | 3/2021 | Keil |
| 2021/0199169 A1 | 7/2021 | Morton et al. |
| 2021/0252935 A1 | 8/2021 | Belter et al. |
| 2022/0250432 A1 | 8/2022 | Hawkins |
| 2022/0388364 A1 | 12/2022 | Fowle et al. |

FOREIGN PATENT DOCUMENTS

| | | |
|---|---|---|
| CN | 111139730 B | 6/2021 |
| CN | 109955704 B | 8/2021 |
| CN | 115560031 A | 1/2023 |
| CN | 115637638 A | 1/2023 |
| DE | 4037223 A1 | 10/1991 |
| DE | 19853876 A1 | 5/2000 |
| DE | 19850169 C1 | 7/2000 |
| DE | 102009060213 A1 | 6/2011 |
| DE | 102010030700 A1 | 1/2012 |
| DE | 102010041404 A1 | 3/2012 |
| DE | 202012002846 U1 | 7/2012 |
| DE | 102012004682 A1 | 9/2013 |
| DE | 102015003530 A1 | 9/2016 |
| DE | 102016000686 A1 | 7/2017 |
| DE | 102016112240 A1 | 1/2018 |
| DE | 102018208774 A1 | 12/2019 |
| EP | 0344923 A1 | 12/1989 |
| EP | 1693233 B1 | 4/2009 |
| EP | 2072855 A1 | 6/2009 |
| EP | 2233330 B1 | 2/2013 |
| EP | 3088230 A1 | 11/2016 |
| EP | 2976544 B1 | 11/2018 |
| GB | 2220625 A | 1/1990 |
| GB | 2437633 A | 10/2007 |
| GB | 2539866 A | 1/2017 |
| JP | S61155211 U | 9/1986 |
| JP | H06183365 A | 7/1994 |
| JP | 2004155258 A | 6/2004 |
| JP | 2005289321 A | 10/2005 |
| JP | 2006200734 A | 8/2006 |
| JP | 2012002300 A | 1/2012 |
| JP | 2012167757 A | 9/2012 |
| JP | 2013244841 A | 12/2013 |
| JP | 5796315 B2 | 10/2015 |
| KR | 20060064917 A | 6/2006 |
| KR | 101509600 B1 | 4/2015 |
| KR | 20170095073 A | 8/2017 |
| WO | 9304883 A1 | 3/1993 |
| WO | 2011148792 A1 | 12/2011 |
| WO | 2012028228 A2 | 3/2012 |
| WO | 2014004118 A1 | 1/2014 |
| WO | 2014004119 A1 | 1/2014 |
| WO | 2014094934 A1 | 6/2014 |
| WO | 2015153811 A1 | 10/2015 |
| WO | 2015169530 A1 | 11/2015 |
| WO | 2016120044 A1 | 8/2016 |
| WO | 2017055151 A1 | 4/2017 |

OTHER PUBLICATIONS

Monroe Intelligent Suspension, "CVSA2/Kinetic: Low Energy For High Performance", www.monroeintelligentsuspension.com/products/cvsa2-kinetic/, Date Unknown, Downloaded Mar. 2, 2017, 2 pp.

Tenneco, "Integrated Kinetic, H2 Ces System, Ride Control Innovation, Accelerated", Rev. Sep. 2011, 4 pp.

porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www.porsche.com/usa/aboutporsche/pressreleases/pag/?pool=international-de&id-2011-01-10, 6 pp.

autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/, Downloaded Mar. 13, 2017, 26 pp.

press.porsche.com, "Introducing the Porsche 918 Spyder", Date Unknown, http://press.porsche.com/news/release.php?id-787, Downloaded Mar. 13, 2017, 7 pp.

Edren, Johannes, "Motion Modelling and Control Strategies of Over-Actuated Vehicles", Doctoral Thesis, Stockholm 2014 (56 pp).

Bolognesi, P., et al., "FEM Modeling and Analysis of a Novel Rotary-Linear Isotropic Brushless Machine", XIX International Conference of Electrical Machines—ICEM 2010, Rome (6 pp).

Xu, Lei, et al., "Design and Analysis of a Double-Stator Linear-Rotary Permanent-Magnet Motor", IEEE Transactions on Applied Superconductivity, vol. 26, No. 4, Jun. 2016, (4 pp).

(56) References Cited

OTHER PUBLICATIONS daimler.com, "Suspension: The world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).

youtube.com., KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).

Wikipedia, "Trailing-arm suspension", https://en.wikipedia.org/wiki/Trailing-arm_suspension, downloaded Sep. 3, 2019 (2 pp).

Cosford, J., "Is it a fair fight? Hydraulics vs. electrics", https://www.mobilehydraulictips.com/fair-fight-hydraulics-vs-electrics/, Mar. 28, 2014 (10 pp).

International Search Report and Written Opinion in Intl App No. PCT/US2022/027040 mailed Jul. 5, 2022 (15 pp).

Collins, S., "J Dampers In Formula One—Racecar Engineering", Downloaded Apr. 18, 2023, https://www.racecar-engineering.com/articles/f1/understanding-the-j-damper/ (4 pp).

* cited by examiner

MOTION CONTROL SYSTEM

CROSS-REFERENCE TO RELATED APPLICATION(S)

This application claims priority to and the benefit of U.S. Provisional Patent Application No. 63/481,620, filed Jan. 26, 2023, the entire disclosure of which is hereby incorporated by reference herein for all purposes.

TECHNICAL FIELD

This disclosure relates generally to the field of motion control systems.

BACKGROUND

A motion control system may be coupled between two structures. As an example, a motion control system may be configured to counteract relative movement of the two structures to reduce the transmission of vibration between the two structures.

SUMMARY

One aspect of the disclosure is a vehicle including a hub retainer configured to rotatably support a wheel along an axis and a brake configured to decelerate rotation of the wheel. The brake includes a rotor configured to rotate about the axis, with the rotor configured to be mounted to the wheel and a caliper mounted to the hub retainer and configured to selectively contact the rotor and induce friction therebetween to decelerate the rotation of the rotor and the wheel. The vehicle includes a damper mass configured to move relative to the hub retainer to counteract vibrations produced by movement of the wheel against a travel surface. The damper mass includes an external surface configured to face toward the rotor with at least a portion of the external surface tapered to direct debris away from the axis and out from between the damper mass and the rotor, a first leg and a second leg disposed on opposing sides of the axis, and a body extending between the first leg and the second leg, with the first leg, the second leg, and the body defining a channel through which the axis extends. The caliper of the brake is positioned above the axis and the channel of the damper mass, with the channel configured to permit movement of the damper mass relative to the caliper.

In some implementations of the vehicle, the external surface extends between a first end and a second end, with the first end closer to the axis than the second end.

In some implementations of the vehicle, at least a portion of the external surface tapers away from the axis and the rotor further from the first end to direct the debris away from the axis and out from between the damper mass and the rotor.

In some implementations of the vehicle, the first end of the damper mass is disposed above the second end of the damper mass, with the tapering of the external surface configured to direct the debris down and away from the axis.

In some implementations of the vehicle, the first end of the damper mass is disposed above the axis and the second end of the damper mass is disposed below the axis, with the tapering of the external surface extending across the axis.

In some implementations of the vehicle, the rotor has a contact surface that is substantially planar and faces the external surface of the damper mass, with the contact surface positioned substantially orthogonal to the axis.

In some implementations of the vehicle, the external surface of the damper mass and the contact surface of the rotor define a gap therebetween that increases toward the second end.

In some implementations of the vehicle, the gap between the external surface and the contact surface is at least 5 millimeters.

In some implementations of the vehicle, the vehicle further comprises a ramp surface projecting outwardly from the external surface and extending between the first end and the second end, with the ramp surface configured to contact debris moving along the external surface and direct the debris off the external surface.

In some implementations of the vehicle, the damper mass includes a fore end and an aft end, with the ramp surface tapered from the first end and the fore end toward the second end and the aft end.

In some implementations of the vehicle, the ramp surface is entirely disposed between the fore end and the axis.

In some implementations of the vehicle, the damper mass is configured to move along a mass axis transverse to the axis.

Another aspect of the disclosure is a mass damper system for use with a wheel of a vehicle. The mass damper system includes a damper fixed relative to an axis about which the wheel is configured to rotate, a spring fixed relative to the axis, and a damper mass coupled to the damper and the spring and configured to move relative to the axis to counteract vibrations produced by movement of the wheel. The spring is configured to bias the damper mass toward a neutral position and with the damper configured to dampen movement of the damper mass. The damper mass includes an internal surface configured to face away from the wheel and an external surface spaced from the internal surface and configured to face toward the wheel. The external surface extends between a first end and a second end, with the first end closer to the axis than the second end. At least a portion of the external surface tapers away from the axis and toward the internal surface further from the first end to direct debris away from the axis.

In some implementations of the mass damper system, the first end of the damper mass is disposed above the second end of the damper mass, with the tapering of the external surface configured to direct the debris down and away from the axis.

In some implementations of the mass damper system, the first end of the damper mass is disposed above the axis and the second end of the damper mass is disposed below the axis, with the tapering of the external surface extending across the axis.

In some implementations of the mass damper system, the spring is configured to bias the damper mass along a mass axis transverse to the axis and the damper is configured to dampen the damper mass along the mass axis, with the damper mass configured to move along the mass axis.

Another aspect of the disclosure is a mass damper system for use with a wheel of a vehicle. The mass damper system includes a damper fixed relative to an axis about which the wheel is configured to rotate, a spring fixed relative to the axis, and a damper mass coupled to the damper and the spring and configured to move relative to the axis to counteract vibrations produced by movement of the wheel, with the spring configured to bias the damper mass toward a neutral position and with the damper configured to dampen movement of the damper mass. The damper mass includes an external surface configured to face toward the wheel and extend between a first end and a second end, with the first end closer to the axis than the second end. The damper mass also includes a ramp surface projecting outwardly from the external surface and extending between the first end and the second end, with the ramp surface configured to contact debris moving along the external surface and direct the debris off the external surface.

In some implementations of the mass damper system, the damper mass includes a fore end and an aft end, with the ramp surface tapered from the first end and the fore end toward the second end and the aft end.

In some implementations of the mass damper system, the ramp surface is entirely disposed between the fore end and the axis.

In some implementations of the mass damper system, the ramp surface is a first ramp surface, the mass damper system further comprising a second ramp surface projecting outwardly from the external surface and extending between the first end and the second end, with the second ramp surface tapered from the first end and the fore end toward the second end and the aft end and entirely disposed between the aft end and the axis.

DETAILED DESCRIPTION

This disclosure is directed to a mass damper system of a vehicle.

A mass damper system can be used to reduce unwanted vibration effects, such as wheel hop, which may be transmitted to a body of a vehicle. The mass damper system includes a damper mass coupled to a wheel and supported by a spring and a damper. The damper mass is smaller than the mass of a primary mass, such as the body, and oscillates to counter vibrations experienced by the wheel. The oscillations of the damper mass result in a reduction of unwanted vibration effects.

The mass damper system described herein is positioned adjacent to a rotor of a brake that decelerates the wheel and the vehicle. The damper mass has an external surface that faces the rotor and is spaced from the rotor. The spacing between the damper mass and the rotor could allow debris (such as stones, pieces of concrete, etc.) to enter therebetween. To prevent the debris from wedging between the damper mass and the rotor and consequently inhibiting operation of or damaging the damper mass and/or the rotor, the external surface is tapered relative to the rotor. The tapering promotes expulsion of the debris out from the spacing between the damper mass and the rotor.

Figure 1:
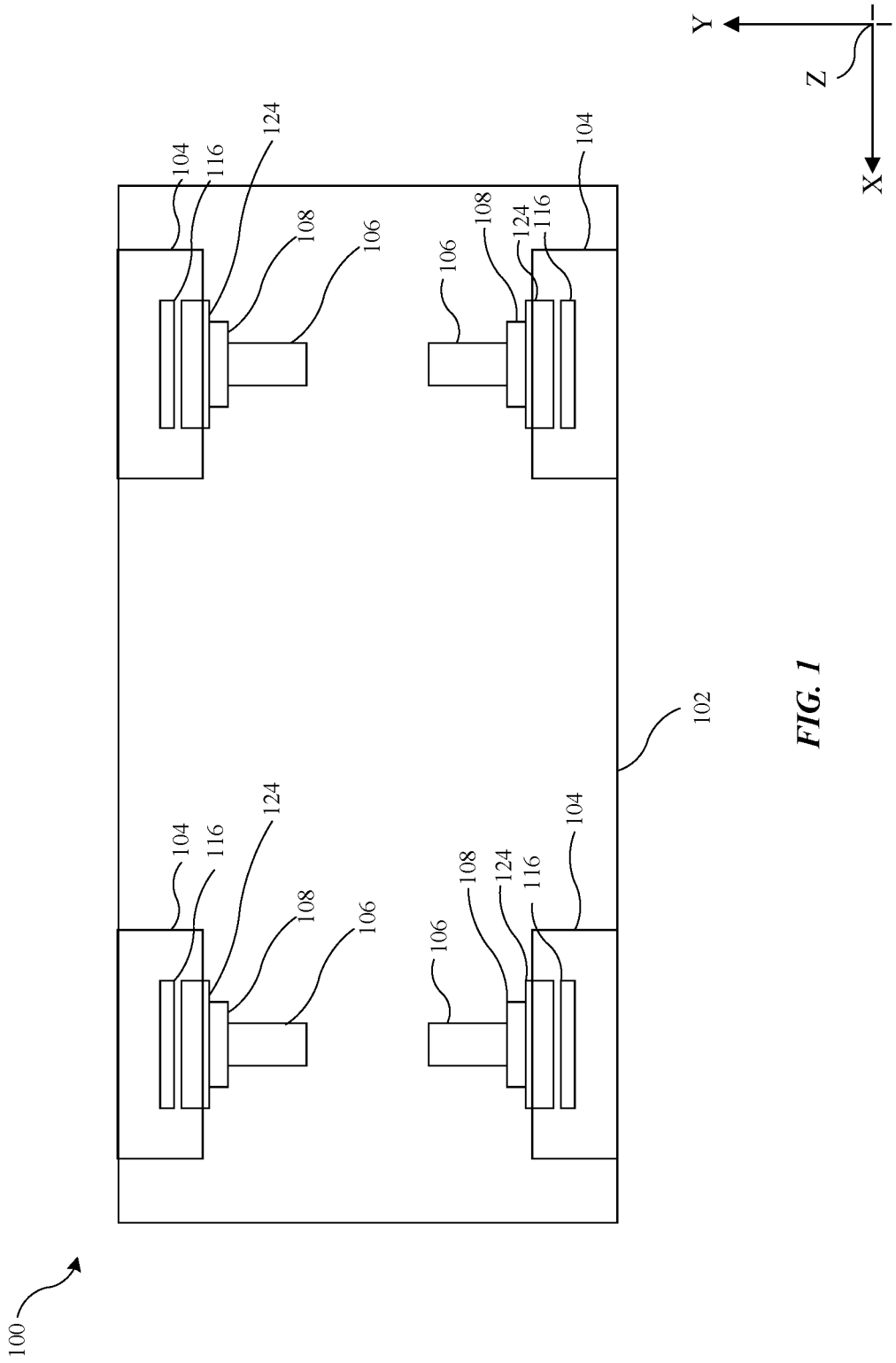
FIG. 1 is a schematic top view illustration of a vehicle comprising mass damper systems.

FIG. 1 is a schematic top view illustration of a vehicle 100. The vehicle 100 includes a body 102. The body 102 may define a passenger compartment for carrying passengers. The body 102 may be constructed of one or more components, including (but not limited to) a frame, a subframe, a unibody, a monocoque, exterior body panels, interior body panels, and movable panels (e.g., doors, tailgate, hood, trunk lid, etc.). The vehicle 100 will be described with reference to a longitudinal direction X (e.g., fore-aft), a lateral direction Y (e.g., side to side), and an elevational direction Z (e.g., up-down). The vehicle 100 may be a road-going vehicle that is able to travel freely upon roadways and other surfaces. The vehicle 100 includes wheels 104 that are coupled to and support the body 102. Although four of the wheels 104 are shown, the vehicle 100 may utilize any number of wheels.

The vehicle 100 includes a suspension assembly 106 disposed at the wheel 104 (e.g., four of the suspension assemblies 106 individually disposed at the four wheels 104). The suspension assembly 106 controls vertical motion of the wheel 104 relative to the body 102, for example, to ensure contact between the wheel 104 and a surface of the roadway and to limit the influence of roadway conditions on undesirable movements of the body 102. The suspension assembly 106 may be an active suspension assembly that includes a suspension actuator that provides positive and negative displacement of the wheel 104 relative to the body 102. More specifically, the suspension actuator may move the wheel 104 up and down relative to the body 102. Alternatively, the suspension assembly 106 may be a passive suspension assembly that includes a spring for biasing the body 102 relative to the wheel 104 and a shock absorber for damping movement of the body 102 relative to the wheel 104.

Figure 2:
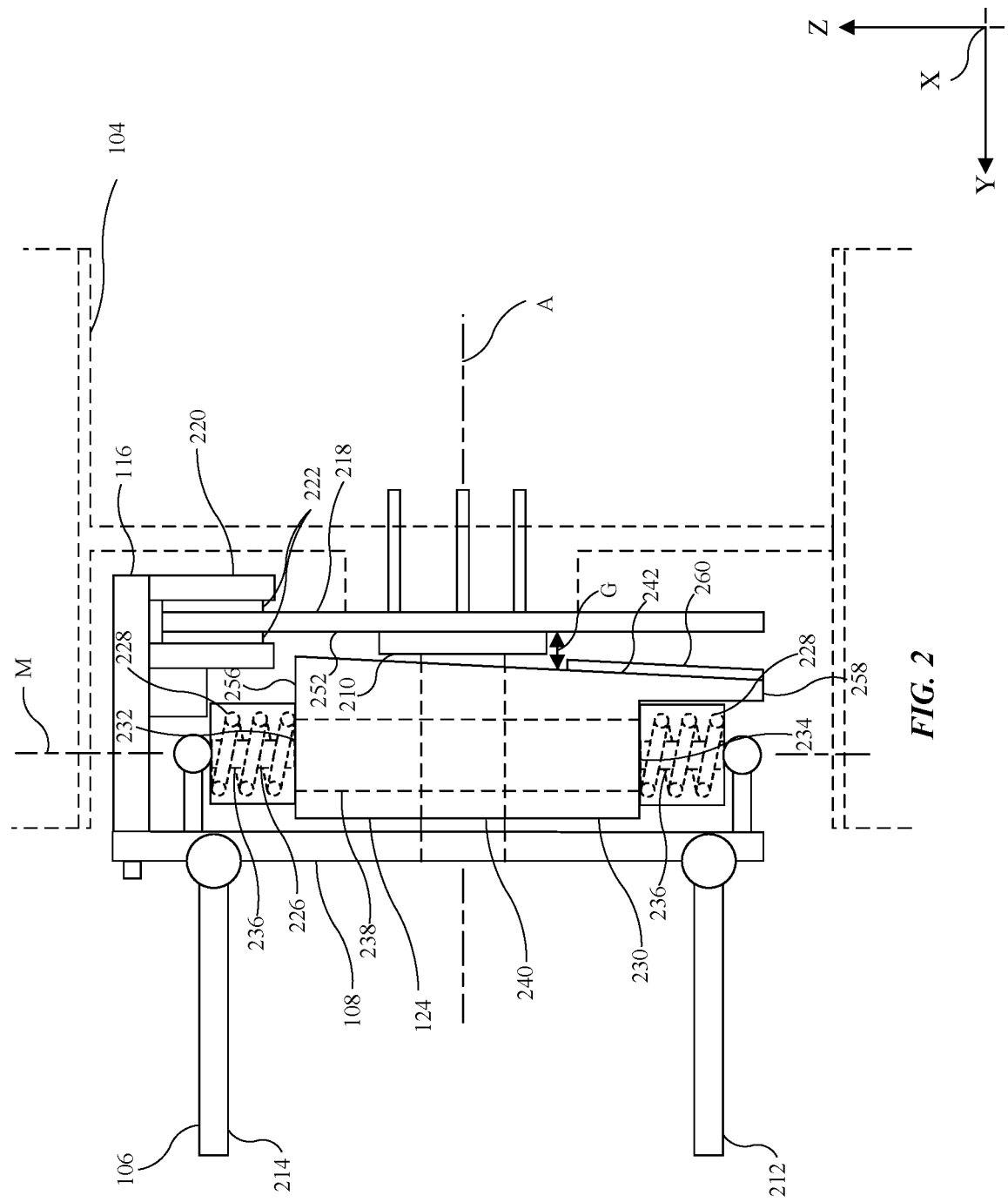
FIG. 2 is a schematic front view illustration of an example implementation of the mass damper system.

The suspension assembly 106 includes a hub retainer 108 configured to rotatably support the wheel 104. FIG. 2 is a schematic front view illustration of one of the suspension assemblies 106, showing the hub retainer 108 extending substantially in the elevational direction Z. The suspension assembly 106 includes a hub 210 that is rotatably coupled to the hub retainer 108 through a bearing. The wheel 104 is mounted to the hub 210, with the hub 210 allowing rotation of the wheel 104 along the surface of the roadway. The wheel 104 is configured to rotate about an axis A (e.g., four axes A individually disposed at the four wheels 104). The suspension assembly 106 further includes a first control arm 212 and a second control arm 214. The first control arm 212 and the second control arm 214 are spaced from one another and extend between the body 102 and the hub retainer 108. The first control arm 212 and the second control arm 214 are rotatably coupled to the body 102 and the hub retainer 108. More specifically, the first control arm 212 is rotatably coupled to a lower portion of the hub retainer 108 and the second control arm 214 is rotatably coupled to an upper portion of the hub retainer 108, with the hub 210 positioned between the lower portion and the upper portion of the hub retainer 108. The articulation between the control arm and the body 102 and between the control arm and the hub retainer 108 allows generally vertical motion of the hub retainer 108 and the wheel 104.

The use of the first control arm 212 and the second control arm 214 as shown in FIG. 2 is commonly referred to as a double wishbone suspension. In other implementations, only one control arm is coupled to the hub retainer 108 (such as a MacPherson strut suspension). It is to be appreciated that any number of control arms may be utilized. Moreover, the control arm(s) may be disposed in any suitable position relative to the body 102, the hub retainer 108, and/or one another.

As shown in FIG. 1, the vehicle 100 includes a brake 116 configured to decelerate the rotation of the wheel 104 (e.g., four of the brakes 116 individually disposed at the four wheels 104). The brake 116 includes a rotor 218 configured to rotate about the axis A, as shown in FIG. 2. The rotor 218 is configured to be mounted to the wheel 104. More specifically, the rotor 218 is disposed between and in engagement with the hub 210 and the wheel 104. The hub 210 may include lugs that extend through and engage the rotor 218 and the wheel 104 to rotatably fix the hub 210, the rotor 218, and the wheel 104 about the axis A. The brake 116 includes a caliper 220 mounted to the hub retainer 108 and configured to selectively contact the rotor 218 and induce friction therebetween for decelerating the rotation of the rotor 218 and the wheel 104. More specifically, the caliper 220 may include a pair of pads 222 disposed on opposing sides of the rotor 218 and at least one piston configured to selectively move the pads 222 toward one another and into engagement with the rotor 218. Since the caliper 220 is mounted to the hub retainer 108, the caliper 220 does not rotate about the axis A. Therefore, engagement of the pads 222 with the rotor 218 induces friction that decelerates the rotation of the rotor 218, the hub 210, and the wheel 104 about the axis A. Although in this example the caliper 220 and the rotor 218 utilize friction to decelerate rotation of the rotor 218 and the wheel 104, the caliper 220 and the rotor 218 may utilize other forces to decelerate the rotation of the wheel 104, such as magnetism between the caliper 220 and the rotor 218. It is to be appreciated that the brake 116 may utilize any suitable system for decelerating the rotation of the wheel 104.

As shown in FIG. 1, the vehicle 100 includes a mass damper system 124 for use with the wheel 104 (e.g., four of the mass damper systems 124 individually disposed at the four wheels 104). The mass damper system 124 is mounted to the hub retainer 108. In one example, the mass damper system 124 is disposed within the wheel 104 (i.e., positioned along the axis A such that the mass damper system 124 is encircled by the wheel 104). However, the mass damper system 124 may be positioned anywhere with respect to the wheel 104. As shown in FIG. 2, the mass damper system 124 includes a damper 226 fixed relative to the axis A about which the wheel 104 rotates, a spring 228 fixed relative to the axis A, and a damper mass 230 coupled to the damper 226 and the spring 228 and configured to move relative to the axis A for counteracting vibrations produced by movement of the wheel 104. More specifically, the damper mass 230 is configured to move relative to the hub retainer 108 for counteracting vibrations produced by movement of the wheel 104 against a travel surface. The damper mass 230 is configured to move along a mass axis M transverse to the axis A, with the spring 228 biasing and the damper 226 damping movement of the damper mass 230 along the mass axis M. More specifically, the mass axis M extends in a generally vertical direction that corresponds with movement of the wheel 104 with the suspension assembly 106 as the wheel 104 moves in response to the travel surface. However, the mass axis M may be disposed in any suitable orientation relative to the axis A.

The mass damper system 124 is a passive device that is configured to reduce vibration of an external structure to which it is mounted, such as the body 102 of the vehicle 100. The damper mass 230 moves with respect to and in response to movement of the wheel 104 and the hub retainer 108. The spring 228 is configured to bias the damper mass 230 toward a neutral position. The damper 226 is configured to dampen movement of the damper mass 230. Selection of dynamic properties of the spring 228 and the damper 226 can tune movement of the damper mass 230. The tuned movement of the damper mass 230 is regulated by the spring 228 and the damper 226 to counter vibration of the wheel 104 and the hub retainer 108. The spring 228 resists motion of the damper mass 230 away from the neutral position with respect to the hub retainer 108. The spring 228 also acts to bias the damper mass 230 toward the neutral position with respect to the hub retainer 108. The neutral position of the damper mass 230 is a rest position with respect to the hub retainer 108. The damper mass 230 will be located at the neutral position absent application of an external force to the hub retainer 108. The spring 228 supports the damper mass 230 so that the damper mass 230 can move in two directions with respect to the neutral position (e.g., positive and negative displacements with respect to the mass axis M). The damper 226 is connected to the damper mass 230 and the hub retainer 108 to resist movement of the damper mass 230 with respect to the hub retainer 108 (e.g., by resisting movements toward and away from the neutral position). As such, the mass damper system 124 is configured to damp vibration of the wheel 104 and the hub retainer 108, such as, for example, reducing the occurrence of wheel hop. The mass damper system 124 damps vibration of the wheel 104 and the hub retainer 108 by regulating movement of the damper mass 230. By damping vibration of the wheel 104 and the hub retainer 108, the mass damper system 124 can reduce a transmission of vibration from the wheel 104 and the hub retainer 108 to the body 102 of the vehicle 100.

The mass damper system 124 may comprise multiple springs 228 and multiple dampers 226. In the example shown in the Figures, the mass damper system 124 includes two springs 228 and two dampers 226. The dampers 226 are spaced from one another in the longitudinal direction X of the vehicle 100 and are disposed on opposing sides of the axis A. The dampers 226 extend longitudinally parallel to one another and the mass axis M. Two of the springs 228 are disposed adjacent to one of the dampers 226 and the other two of the springs 228 are disposed adjacent to the other one of the dampers 226. Furthermore, two of the springs 228 extend upwardly from a first side 232 of the damper mass 230 and the other two of the springs 228 extend downwardly from a second side 234 of the damper mass 230, opposite the first side 232.

Movement of the damper mass 230 along the mass axis M results in deflection of the springs 228. More specifically, movement of the damper mass 230 upwards along the mass axis M results in compression of the springs 228 disposed along the first side 232 of the damper mass 230 and extension of the springs 228 disposed along the second side 234 of the damper mass 230. Movement of the damper mass 230 downwards along the mass axis M results in compression of the springs 228 disposed along the second side 234 of the damper mass 230 and extension of the springs 228 disposed along the first side 232 of the damper mass 230. The springs 228 on the first side 232 of the damper mass 230 and the springs 228 on the second side 234 of the damper mass 230 exert opposing biases on the damper mass 230. Equalization of the opposing biases occurs when the damper mass 230 is disposed in a neutral position. The disposition of the springs 228 on the first side 232 of the damper mass 230 opposite the springs 228 on the second side 234 of the damper mass 230 allows the damper mass 230 to oscillate along the mass axis M. It is to be appreciated that any number of springs 228 may be utilized to bias the damper mass 230. Furthermore, while the springs 228 are shown in the Figures as a coil spring, any suitable configuration may be utilized, such as a torsion spring, deflection spring, etc. Moreover, the damper mass 230 may be biased by any component suitable for exerting a bias, such as a fluid bladder, an electromagnet, etc.

The damper mass 230 is configured to move relative to the hub retainer 108 and the dampers 226 are configured to dampen movement of the damper mass 230 relative to the hub retainer 108. Each of the dampers 226 comprise a body section 236 and a displacement section 238. The body section 236 is coupled to the hub retainer 108. More specifically, the body section 236 is substantially fixed relative to the hub retainer 108 such that the body section 236 of the damper 226 and the hub retainer 108 generally move in unison. The body section 236 extends to a pair of ends disposed on opposite sides of the damper mass 230, with the pair of ends fixed to a pair of mounts on the hub retainer 108. The mass damper system 124 may comprise a bushing, isolator, etc., disposed between the damper 226 and the hub retainer 108 to provide a compliance fit that allows for positional variations between the mass damper system 124 and the hub retainer 108 (e.g., variations in thermal expansion, variations in production tolerances, etc.).

The displacement section 238 of the damper 226 is coupled to the damper mass 230 and configured to move with the damper mass 230 relative to the body section 236. More specifically, the displacement section 238 of the damper 226 is fixed relative to the damper mass 230 such that the displacement section 238 and the damper mass 230 move in unison. The displacement section 238 and the damper mass 230 may be fixed relative to one another by any suitable manner, such as press fit engagement, mechanical fastening, welding, chemical bonding, etc. The damping between the body section 236 and the displacement section 238 may be performed in any suitable manner, such as movement of a fluid through an opening, the attraction and/or repulsion from a magnetic field, etc.

Figure 3:
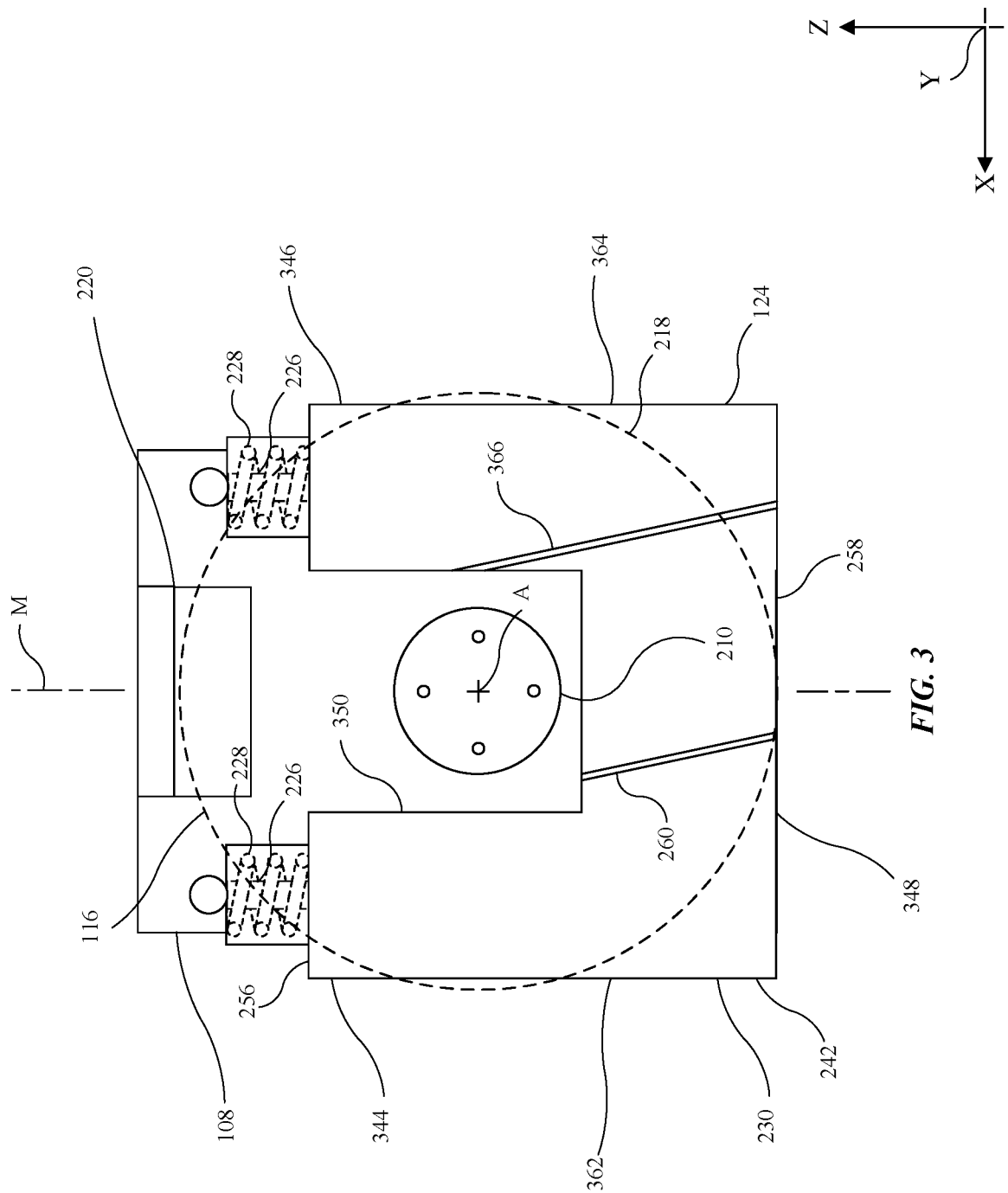
FIG. 3 is a schematic side view illustration of an example implementation of the mass damper system.

The mass damper system 124 is disposed generally between the hub retainer 108 and the rotor 218 of the brake 116 along the axis A. More specifically, the damper mass 230 includes an internal surface 240 configured to face away from the wheel 104 and toward the hub retainer 108. The damper mass 230 further includes an external surface 242 spaced from the internal surface 240 and configured to face toward the wheel 104 and the rotor 218. FIG. 3 is a schematic side view illustration of the mass damper system 124, showing the damper mass 230 including a first leg 344 and a second leg 346 disposed on opposing sides of the axis A, and a body 348 extending between the first leg 344 and the second leg 346, with the first leg 344, the second leg 346, and the body 348 defining a channel 350 through which the axis A extends. More specifically, the hub 210 extends from the hub retainer 108 and through the channel 350 of the damper 226 to engage the rotor 218 and the wheel 104. The body 348 of the damper mass 230 is disposed below the hub 210 with the channel 350 opening upwardly along the mass axis M. The body 348 is spaced from the hub 210 such that the damper mass 230 may move generally up and down along the mass axis M without contacting the hub 210. More specifically, the hub 210 moves within the channel 350 spaced from the damper 226 as the damper 226 moves along the mass axis M.

The caliper 220 of the brake 116 is positioned above the axis A and the channel 350 of the damper mass 230. More specifically, the caliper 220 is generally aligned with the mass axis M above the hub 210 such that the damper mass 230 moves along the mass axis M toward and away from the caliper 220. The channel 350 is configured to permit movement of the damper mass 230 relative to the caliper 220. More specifically, although the damper mass 230 may move toward the caliper 220, the channel 350 provides spacing that prevents contact between the caliper 220 and the damper mass 230. By positioning the caliper 220 above the channel 350, the hub retainer 108, the mass damper system 124, and the brake 116 may be positioned closer to one another along the axis A, which improves the packaging of the components and reduces the length of the hub 210. Reducing the length of the hub 210 moves the wheel 104 closer to the hub retainer 108 and thereby reduces a moment exerted on the hub 210 about the hub retainer 108 from the tangential load exerted from the weight of the vehicle 100 on the wheel 104.

Figure 4:
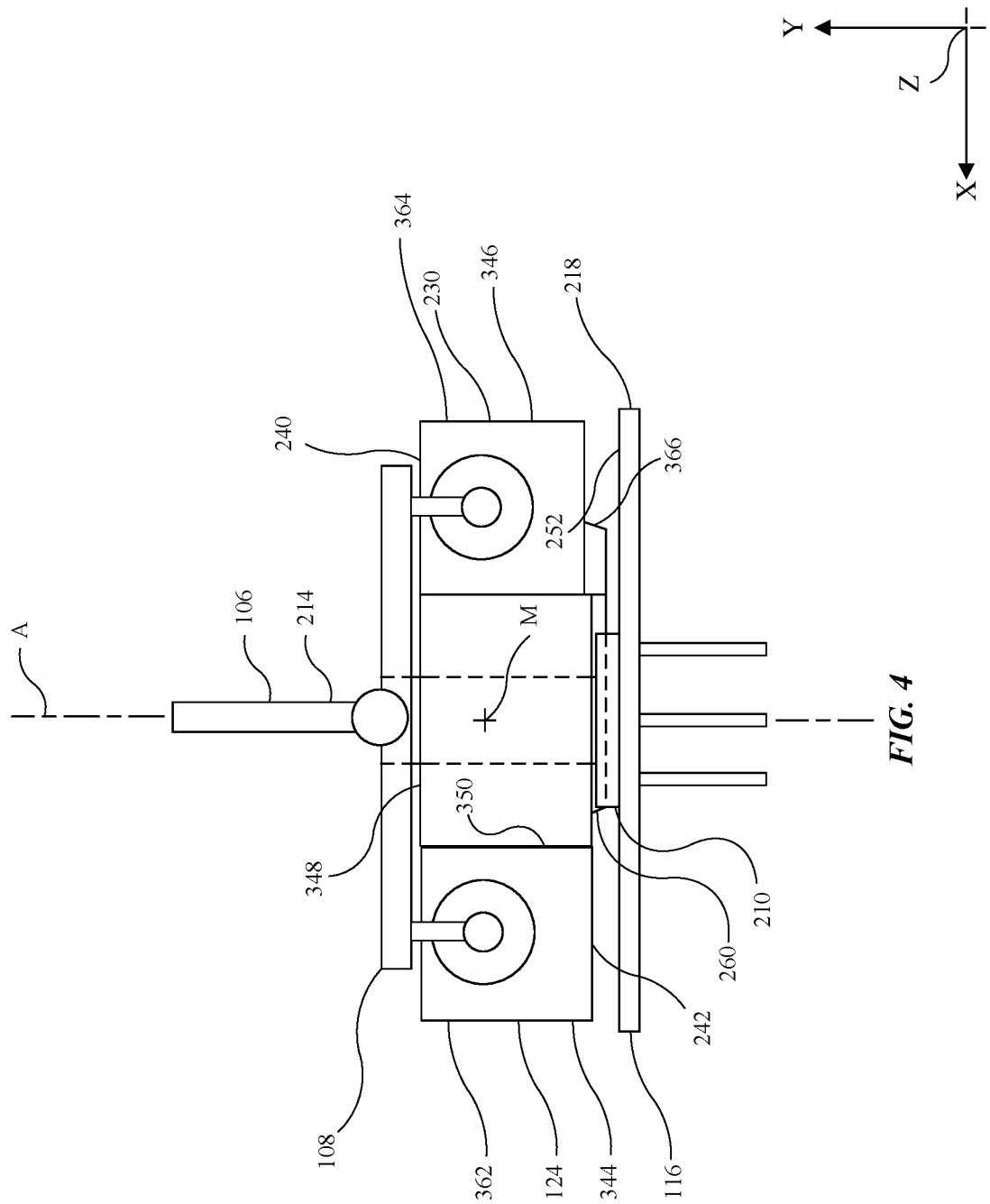
FIG. 4 is a schematic top view illustration of an example implementation of the mass damper system.

FIG. 4 is a schematic top view illustration of the mass damper system 124, showing the damper mass 230 and the rotor 218 are disposed adjacent to one another along the axis A. The rotor 218 has a contact surface 252 that is substantially planar and faces the external surface 242 of the damper mass 230, with the contact surface 252 positioned substantially orthogonal to the axis A. As shown in FIG. 2, the external surface 242 of the damper mass 230 and the contact surface 252 of the rotor 218 define a gap G therebetween. The gap G prevents contact between the damper mass 230 and the rotor 218, which would inhibit the damper mass 230 from moving along the mass axis M. In the example shown in FIGS. 2 and 4, the gap G is void of any other components (i.e., there are no components between the damper mass 230 and the rotor 218). The gap G between the damper mass 230 and the rotor 218 may allow debris to enter therebetween. If the external surface 242 of the damper mass 230 were to be planar and parallel to the contact surface 252 of the rotor 218 (i.e., consistent spacing of the gap G), debris that is sized substantially equal to the gap G may become wedged between the damper mass 230 and rotor 218. The debris may then inhibit motion of the damper mass 230 along the mass axis M. Furthermore, the debris may rub against the rotor 218 as the rotor 218 rotates about the axis A causing damage to the rotor 218 and/or the damper mass 230.

Accordingly, at least a portion of the external surface 242 is tapered to direct debris away from the axis A and out from between the damper mass 230 and the rotor 218. More specifically, the external surface 242 extends between a first end 256 and a second end 258, with the first end 256 closer to the axis A than the second end 258. As such, the gap G between the external surface 242 of the damper mass 230 and the contact surface 252 of the rotor 218 increases toward the second end 258. In the example shown in FIG. 2, the first end 256 of the damper mass 230 is disposed above the second end 258 of the damper mass 230. At least a portion of the external surface 242 tapers away from the axis A and the rotor 218 (and toward the internal surface 240 of the damper mass 230) further from the first end 256 to direct debris away from the axis A and out from between the damper mass 230 and the rotor 218. As such, the gap G between the external surface 242 and the rotor 218 becomes greater toward the second end 258, which is below the first end 256. The force exerted on the debris due to gravity acts in the same direction as the increase in the gap G between the external surface 242 of the damper mass 230 and the rotor 218, which further promotes expulsion of the debris from between the damper mass 230 and the rotor 218. Furthermore, the gap G between the external surface 242 and the rotor 218 becomes greater further from the axis A, which promotes expelling debris away from the axis A rather than toward the axis A where the rotational velocity of the debris would decrease and become prone to wedging.

In the example shown in FIG. 3, the first leg 344 and the second leg 346 extend above the axis A in the neutral position. As such, the first end 256 of the damper mass 230 is disposed above the axis A and the second end 258 of the damper mass 230 is disposed below the axis A, with the tapering of the external surface 242 extending across the axis A. Said differently, the external surface 242 of the damper mass 230 is tapered from top to bottom, as shown in FIG. 2. The tapering of the external surface 242 moves the debris generally down and away from the axis A.

In one example, the gap G between the external surface 242 and the contact surface 252 is at least 5 millimeters (mm). More specifically, the gap G between the external surface 242 and the contact surface 252 where the external surface 242 and the contact surface 252 are closest (e.g., the first end 256) is at least 5 mm. In another example, the gap G between the external surface 242 and the contact surface 252 is at least 10 millimeters (mm). In one example, the gap G between the external surface 242 and the contact surface 252 at the second end 258 is at least 1.1 times greater than the gap G at the first end 256. In another example, the gap G between the external surface 242 and the contact surface 252 at the second end 258 is at least 1.2 times greater than the gap G at the first end 256. In another example, the gap G between the external surface 242 and the contact surface 252 at the second end 258 is at least 1.3 times greater than the gap G at the first end 256.

As shown in FIGS. 2-4, the vehicle 100 further comprises a ramp surface 260 projecting outwardly from the external surface 242 and extending between the first end 256 and the second end 258. The ramp surface 260 is configured to contact debris moving along the external surface 242 and direct the debris off the external surface 242. More specifically, the ramp surface 260 extends transverse to the external surface 242 generally in the direction of the axis A. As shown in FIG. 3, the damper mass 230 includes a fore end 362 and an aft end 364, with the fore end 362 facing a front end of the vehicle 100 and the aft end 364 faces a rear end of the vehicle 100 along the longitudinal direction X. The external surface 242 of the damper mass 230 extends between the fore end 362 and the aft end 364. The ramp surface 260 is tapered from the first end 256 and the fore end 362 toward the second end 258 and the aft end 364. Said differently, the ramp surface 260 extends downwardly at an angle from the fore end 362 toward the aft end 364. In the example shown FIG. 3, the ramp surface 260 is entirely disposed between the fore end 362 and the axis A. Said differently, the ramp surface 260 may be disposed on the first leg 344 and/or the body 348 of the damper mass 230. However, the ramp surface 260 may extend from any suitable portion of the external surface 242, including from the second leg 346.

The ramp surface 260 is configured to aide in the expulsion of debris from between the damper mass 230 and the rotor 218 as the vehicle 100 is in motion (more specifically, forward motion). As the vehicle 100 is driven forward, the wheel 104 and the rotor 218 move in a counterclockwise direction with respect to FIG. 3. With continued reference to FIG. 3, if debris enters between the damper mass 230 and the rotor 218, the tapering of the external surface 242 promotes expulsion of the debris down and away from the axis A. However, if the debris does manage to progress in toward the axis A and come in constant contact with the contact surface 252 of the rotor 218, the friction between the debris and the rotor 218 will result in rotation of the debris with the rotor 218 in the counterclockwise direction. If the debris does not naturally expel from between the damper mass 230 and the rotor 218, the debris will eventually pass along the external surface 242 of the first leg 344 and come into contact with the ramp surface 260. The tapering of the ramp surface 260 from the first end 256 and the fore end 362 toward the second end 258 and the aft end 364, in conjunction with the counter-clockwise rotation of the rotor 218, results in the debris moving down the ramp surface 260 toward the second end 258 of the damper mass 230 (i.e., down and away from the axis A), thus expelling the debris from between the damper mass 230 and the rotor 218.

In the example shown in FIG. 3, the ramp surface 260 is a first ramp surface 260. The mass damper system 124 further comprises a second ramp surface 366 projecting outwardly from the external surface 242 and extending between the first end 256 and the second end 258, with the second ramp surface 366 tapered from the first end 256 and the fore end 362 toward the second end 258 and the aft end 364. Said differently, the second ramp surface 366 extends downwardly at an angle from the fore end 362 toward the aft end 364. The second ramp surface 366 is entirely disposed between the aft end 364 and the axis A. Said differently, the second ramp surface 366 may be disposed on the second leg 346 and/or the body 348 of the damper mass 230. However, the second ramp surface 366 may extend from any suitable portion of the external surface 242, including from the first leg 344.

Like the first ramp surface 260, the second ramp surface 366 is configured to aide in the expulsion of debris from between the damper mass 230 and the rotor 218 as the vehicle 100 is in motion. However, while the first ramp surface 260 substantially faces the fore end 362 of the damper mass 230, the second ramp surface 366 substantially faces the aft end 364 of the damper mass 230. As such, the second ramp surface 366 is configured to aide in the expulsion of debris from between the damper mass 230 and the rotor 218 as the vehicle 100 is in reverse motion. As the vehicle 100 is driven in reverse, the wheel 104 and the rotor 218 move in a clockwise direction with respect to FIG. 3. With continued reference to FIG. 3, if debris enters between the damper mass 230 and the rotor 218, the tapering of the external surface 242 promotes expulsion of the debris down and away from the axis A. However, if the debris does manage to progress inward toward the axis A and come in constant contact with the contact surface 252 of the rotor 218, the friction between the debris and the rotor 218 will result in rotation of the debris with the rotor 218 in the clockwise direction. If the debris does not naturally expel from between the damper mass 230 and the rotor 218, the debris will eventually pass along the external surface 242 of the second leg 346 and come into contact with the second ramp surface 366. The tapering of the second ramp surface 366 from the first end 256 and the fore end 362 toward the second end 258 and the aft end 364, in conjunction with the clockwise rotation of the rotor 218, results in the debris moving down the second ramp surface 366 toward the second end 258 of the damper mass 230 (i.e., down and away from the axis A), thus expelling the debris from between the damper mass 230 and the rotor 218.

The mass damper system 124 may be implemented in the context of a system, such as the vehicle 100, that includes gathering and use of data available from various sources for use in controlling operation of the vehicle 100. As an example, such data may identify the user and include user-specific settings or preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores user preference related information that allows operation of the vehicle 100 according to user preferences. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, information may be determined each time the system is used, and without subsequently storing the information or associating with the particular user.

What is claimed is:

1. A vehicle, comprising:
   a hub retainer configured to rotatably support a wheel along an axis;
   a brake configured to decelerate rotation of the wheel, the brake comprising:
      a rotor configured to rotate about the axis, with the rotor configured to be mounted to the wheel, and
      a caliper mounted to the hub retainer and configured to selectively contact the rotor and induce friction therebetween to decelerate the rotation of the rotor and the wheel; and
   a damper mass configured to move relative to the hub retainer to counteract vibrations produced by movement of the wheel against a travel surface, with the damper mass comprising:
      an external surface configured to face toward the rotor with at least a portion of the external surface tapered to direct debris away from the axis and out from between the damper mass and the rotor;
      a first leg and a second leg disposed on opposing sides of the axis; and
      a body extending between the first leg and the second leg, with the first leg, the second leg, and the body defining a channel through which the axis extends,
   wherein the caliper of the brake is positioned above the axis and the channel of the damper mass, with the channel configured to permit movement of the damper mass relative to the caliper.

2. The vehicle of claim 1, wherein the external surface extends between a first end and a second end, with the first end closer to the axis than the second end.

3. The vehicle of claim 2, wherein at least a portion of the external surface tapers away from the axis and the rotor further from the first end to direct the debris away from the axis and out from between the damper mass and the rotor.

4. The vehicle of claim 3, wherein the first end of the damper mass is disposed above the second end of the damper mass, with the tapering of the external surface configured to direct the debris down and away from the axis.

5. The vehicle of claim 4, wherein the first end of the damper mass is disposed above the axis and the second end of the damper mass is disposed below the axis, with the tapering of the external surface extending across the axis.

6. The vehicle of claim 3, wherein the rotor has a contact surface that is substantially planar and faces the external surface of the damper mass, with the contact surface positioned substantially orthogonal to the axis.

7. The vehicle of claim 6, wherein the external surface of the damper mass and the contact surface of the rotor define a gap therebetween that increases toward the second end.

8. The vehicle of claim 7, wherein the gap between the external surface and the contact surface is at least 5 millimeters.

9. The vehicle of claim 3, further comprising a ramp surface projecting outwardly from the external surface and extending between the first end and the second end, with the ramp surface configured to contact debris moving along the external surface and direct the debris off the external surface.

10. The vehicle of claim 9, wherein the damper mass includes a fore end and an aft end, with the ramp surface tapered from the first end and the fore end toward the second end and the aft end.

11. The vehicle of claim 10, wherein the ramp surface is entirely disposed between the fore end and the axis.

12. The vehicle of claim 1, wherein the damper mass is configured to move along a mass axis transverse to the axis.

13. A mass damper system for use with a wheel of a vehicle, the mass damper system comprising:
   a damper fixed relative to an axis about which the wheel is configured to rotate;
   a spring fixed relative to the axis; and
   a damper mass coupled to the damper and the spring and configured to move relative to the axis to counteract vibrations produced by movement of the wheel, with the spring configured to bias the damper mass toward a neutral position and with the damper configured to dampen movement of the damper mass, the damper mass comprising:
      an internal surface configured to face away from the wheel, and
      an external surface spaced from the internal surface and configured to face toward the wheel,
      wherein the external surface extends between a first end and a second end, with the first end closer to the axis than the second end, and
      wherein at least a portion of the external surface tapers away from the axis and toward the internal surface further from the first end to direct debris away from the axis.

14. The mass damper system of claim 13, wherein the first end of the damper mass is disposed above the second end of the damper mass, with the tapering of the external surface configured to direct the debris down and away from the axis.

15. The mass damper system of claim 14, wherein the first end of the damper mass is disposed above the axis and the second end of the damper mass is disposed below the axis, with the tapering of the external surface extending across the axis.

16. The mass damper system of claim 13, wherein the spring is configured to bias the damper mass along a mass axis transverse to the axis and the damper is configured to dampen the damper mass along the mass axis, with the damper mass is configured to move along the mass axis.

17. A mass damper system for use with a wheel of a vehicle, the mass damper system comprising:
   a damper fixed relative to an axis about which the wheel is configured to rotate;
   a spring fixed relative to the axis; and
   a damper mass coupled to the damper and the spring and configured to move relative to the axis to counteract vibrations produced by movement of the wheel, with the spring configured to bias the damper mass toward a neutral position and with the damper configured to dampen movement of the damper mass, the damper mass comprising:
      an external surface configured to face toward the wheel and extend between a first end and a second end, with the first end closer to the axis than the second end, and
      a ramp surface projecting outwardly from the external surface and extending between the first end and the second end, with the ramp surface configured to contact debris moving along the external surface and direct the debris off the external surface.

18. The mass damper system of claim 17, wherein the damper mass includes a fore end and an aft end, with the ramp surface tapered from the first end and the fore end toward the second end and the aft end.

19. The mass damper system of claim 18, wherein the ramp surface is entirely disposed between the fore end and the axis.

20. The mass damper system of claim 18, wherein the ramp surface is a first ramp surface, the mass damper system further comprising a second ramp surface projecting outwardly from the external surface and extending between the first end and the second end, with the second ramp surface tapered from the first end and the fore end toward the second end and the aft end and entirely disposed between the aft end and the axis.

* * * * *

UNITED STATES PATENT AND TRADEMARK OFFICE
CERTIFICATE OF CORRECTION

Page 1 of 1

PATENT NO. : 12,168,375 B1
APPLICATION NO. : 18/405624
DATED : December 17, 2024
INVENTOR(S) : Jacob L. Dawson et al.

It is certified that error appears in the above-identified patent and that said Letters Patent is hereby corrected as shown below:

In the Claims

At Column 14, Claim number 16, Line number 10, "damper mass is configured" should be --damper mass configured--.

Signed and Sealed this
Fourth Day of February, 2025

Coke Morgan Stewart
*Acting Director of the United States Patent and Trademark Office*